United States Patent
Kritchman

(10) Patent No.: US 11,104,169 B2
(45) Date of Patent: *Aug. 31, 2021

(54) METHOD AND SYSTEM FOR BUILDING PAINTED THREE-DIMENSIONAL OBJECTS

(71) Applicant: STRATASYS LTD., Rehovot (IL)

(72) Inventor: Eliahu M. Kritchman, Tel Aviv (IL)

(73) Assignee: STRATASYS LTD., Rehovot (IL)

( * ) Notice: Subject to any disclaimer, the term of this patent is extended or adjusted under 35 U.S.C. 154(b) by 102 days.

This patent is subject to a terminal disclaimer.

(21) Appl. No.: 16/514,398

(22) Filed: Jul. 17, 2019

(65) Prior Publication Data

US 2019/0337315 A1 Nov. 7, 2019

Related U.S. Application Data

(63) Continuation of application No. 15/673,440, filed on Aug. 10, 2017, now Pat. No. 10,399,374, which is a
(Continued)

(51) Int. Cl.
| | |
|---|---|
| *B41M 1/18* | (2006.01) |
| *B28B 1/00* | (2006.01) |
| *B33Y 50/00* | (2015.01) |
| *B33Y 10/00* | (2015.01) |
| *B41M 7/00* | (2006.01) |
| *B41M 5/00* | (2006.01) |
| *B29C 64/112* | (2017.01) |
| *G05B 15/02* | (2006.01) |

(Continued)

(52) U.S. Cl.
CPC .............. *B41M 1/18* (2013.01); *B28B 1/001* (2013.01); *B29C 64/112* (2017.08); *B29C 64/124* (2017.08); *B29C 64/386* (2017.08); *B33Y 10/00* (2014.12); *B33Y 50/00* (2014.12); *B41M 5/0047* (2013.01); *B41M 7/0027* (2013.01); *G05B 15/02* (2013.01); *B29K 2995/002* (2013.01); *B33Y 50/02* (2014.12); *G05B 2219/49023* (2013.01); *Y10T 428/24876* (2015.01)

(58) Field of Classification Search
CPC ... B29C 64/112; B29C 64/124; B29C 64/386; B29K 2295/002; B28B 1/001; B33Y 10/00; B33Y 50/00; B33Y 50/02; B41M 1/18; B41M 5/0047; B41M 7/0027; G05B 15/02; G05B 2219/49023; Y10T 428/24876

See application file for complete search history.

(56) References Cited

U.S. PATENT DOCUMENTS

| | | |
|---|---|---|
| 3,751,282 A | 8/1973 | Massa |
| 4,055,613 A | 10/1977 | Kapral |

(Continued)

OTHER PUBLICATIONS

Office Action dated Jan. 4, 2019 for corresponding U.S. Appl. No. 15/673,440.

(Continued)

*Primary Examiner* — Crystal J Barnes-Bullock
(74) *Attorney, Agent, or Firm* — Pearl Cohen Zedek Latzer Baratz LLP

(57) ABSTRACT

Methods of printing a three-dimensional object, layer by layer are provided. Layers are formed by a bulk inner region which may be formed by depositing a transparent material, a white material, a colored material or a combination thereof, and a color outline which includes voxels formed by depositing a colored building material.

14 Claims, 3 Drawing Sheets

Related U.S. Application Data continuation of application No. 14/696,878, filed on Apr. 27, 2015, now Pat. No. 9,738,033, which is a continuation of application No. 13/195,667, filed on Aug. 1, 2011, now Pat. No. 9,020,627, which is a continuation of application No. 12/364,595, filed on Feb. 3, 2009, now Pat. No. 7,991,498.

(51) Int. Cl.
*B29C 64/386* (2017.01)
*B29C 64/124* (2017.01)
*B33Y 50/02* (2015.01)

(56) References Cited

U.S. PATENT DOCUMENTS

| | | | |
|---|---|---|---|
| 4,974,067 A | 11/1990 | Suzuki et al. | |
| 5,096,530 A | 3/1992 | Cohen | |
| 5,149,548 A | 9/1992 | Yamane et al. | |
| 5,694,324 A | 12/1997 | Masters et al. | |
| 5,712,963 A | 1/1998 | Kobayashi et al. | |
| 5,781,194 A | 7/1998 | Ponomarev et al. | |
| 5,805,971 A | 9/1998 | Akedo | |
| 5,902,441 A | 5/1999 | Bredt et al. | |
| 6,007,318 A | 12/1999 | Russell et al. | |
| 6,025,110 A | 2/2000 | Nowak | |
| 6,129,872 A | 10/2000 | Jang | |
| 6,165,406 A | 12/2000 | Jang et al. | |
| 6,267,052 B1 | 7/2001 | Hull et al. | |
| 6,498,607 B1 | 12/2002 | Pfister et al. | |
| 6,506,477 B1 | 1/2003 | Ueda et al. | |
| 6,507,413 B1 | 1/2003 | Mueller et al. | |
| 6,652,653 B2 * | 11/2003 | Kokubo | B05C 5/0254 118/410 |
| 6,658,314 B1 | 12/2003 | Gothait | |
| 6,742,456 B1 | 6/2004 | Kasperchik et al. | |
| 6,767,091 B1 * | 7/2004 | Kornfeld | B41J 11/0015 347/101 |
| 6,772,026 B2 | 8/2004 | Bradbury et al. | |
| 6,989,115 B2 | 1/2006 | Russell et al. | |
| 7,020,539 B1 | 3/2006 | Kovacevic et al. | |
| 7,086,863 B2 | 8/2006 | Van der Zel | |
| 7,087,291 B2 | 8/2006 | Hill | |
| RE40,024 E | 1/2008 | Hill | |
| 7,357,959 B2 | 4/2008 | Bauer | |
| 7,370,956 B2 | 5/2008 | Figov | |
| 7,448,121 B1 | 11/2008 | Hung | |
| 7,456,842 B2 | 11/2008 | Kosolapov | |
| 7,508,544 B2 * | 3/2009 | Kakutani | H04N 1/4057 358/1.9 |
| 7,562,957 B2 | 7/2009 | Mills et al. | |
| 7,580,095 B2 * | 8/2009 | Okumoto | G02F 1/133512 349/106 |
| 7,693,349 B2 | 4/2010 | Gering | |
| 7,700,016 B2 | 4/2010 | Wigland et al. | |
| 8,012,290 B2 | 9/2011 | Spengler | |
| 8,273,423 B2 * | 9/2012 | Yoshioka | G02F 1/133512 428/1.31 |
| 8,387,673 B2 | 3/2013 | Spengler | |
| 8,603,613 B2 | 12/2013 | Larson | |
| 8,851,609 B2 | 10/2014 | Saita | |
| 9,020,627 B2 * | 4/2015 | Kritchman | B41M 7/0027 700/119 |
| 9,568,886 B2 | 2/2017 | Sung | |
| 9,738,033 B2 * | 8/2017 | Kritchman | B41M 5/0047 |
| 10,011,074 B2 | 7/2018 | Cheng et al. | |
| 10,399,374 B2 * | 9/2019 | Kritchman | B41M 5/0047 |
| 2004/0080078 A1 | 4/2004 | Collins | |
| 2006/0266262 A1 * | 11/2006 | Takada | C09C 1/644 106/403 |
| 2006/0275528 A1 * | 12/2006 | Collins | A23G 3/0097 426/87 |
| 2007/0026102 A1 | 2/2007 | Devos et al. | |
| 2007/0063372 A1 | 3/2007 | Nielsen | |
| 2007/0188528 A1 * | 8/2007 | Kakutani | H04N 1/4057 347/5 |
| 2007/0241665 A1 * | 10/2007 | Sakanoue | H01L 51/5088 313/503 |
| 2008/0030497 A1 | 2/2008 | Hu | |
| 2014/0324204 A1 | 10/2014 | Vidimce | |
| 2015/0258770 A1 | 9/2015 | Chan | |
| 2016/0001505 A1 | 1/2016 | Hakkaku | |
| 2017/0006190 A1 | 1/2017 | Pervill | |
| 2018/0117849 A1 | 5/2018 | Brunton et al. | |
| 2019/0099780 A1 | 4/2019 | Caillier et al. | |

OTHER PUBLICATIONS

Notice of Allowance dated May 1, 2019 for corresponding U.S. Appl. No. 15/673,440.

* cited by examiner

METHOD AND SYSTEM FOR BUILDING PAINTED THREE-DIMENSIONAL OBJECTS

CROSS REFERENCE TO RELATED APPLICATIONS

This application is a continuation of U.S. patent application Ser. No. 15/673,440, filed Aug. 10, 2017, which is a continuation application of U.S. patent application Ser. No. 14/696,878, filed Apr. 27, 2015, now U.S. Pat. No. 9,738,033, which is a continuation application of U.S. patent application Ser. No. 13/195,667, filed Aug. 1, 2011, now U.S. Pat. No. 9,020,627, which in turn is a continuation application of U.S. patent application Ser. No. 12/364,595, filed Feb. 3, 2009, now U.S. Pat. No. 7,991,498, all of which are incorporated herein in their entirety.

BACKGROUND

In three-dimensional printing, the object is formed by selectively depositing material from a deposition device, such as an inkjet print head in successive layers based on cross sections of the object. Although, for most applications the final product can be uni color, in some cases, a painted three-dimensional object is desired.

There have been some attempts to disclose methods for formation of colored objects, for example by using a plurality of printing heads that eject building materials of different colors throughout the entire layer. These methods cannot produce, however, a three-dimensional object with a high-quality painted surface.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
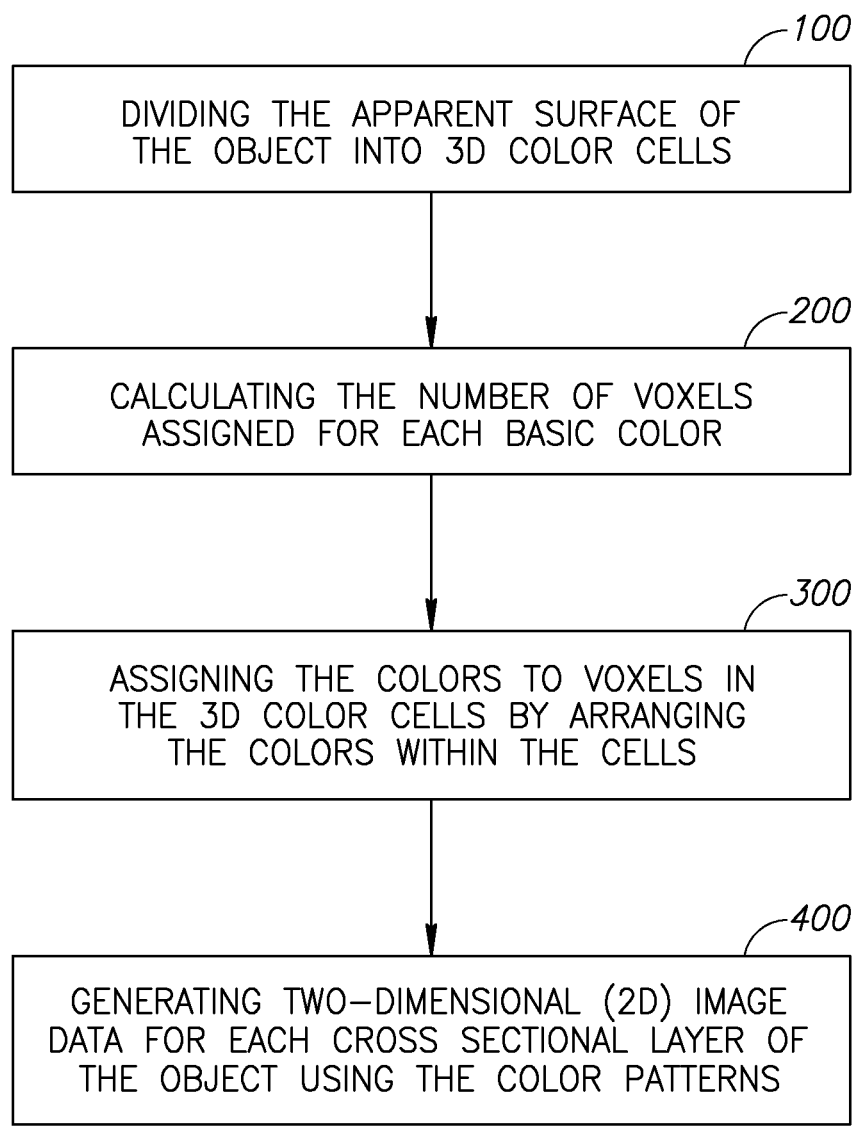
FIG. 1 is a flowchart diagram of a method for forming g a three dimensional colored object according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The processes presented herein are not inherently related to any particular computer or other apparatus. Various general-purpose systems may be used with programs in accordance with the teachings herein, or it may prove convenient to construct a more specialized apparatus to perform embodiments of a method according to embodiments of the present invention. Embodiments of structures for a variety of these systems appear from the description herein. In addition, embodiments of the present invention are not described with reference to any particular programming language. It will be appreciated that a variety of programming languages may be used to implement the teachings of the invention as described herein.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device which may be included in a printing machine, that may manipulate and/or transform data represented as physical (e.g., electronic) quantities within the computer's registers and/or memories into other data similarly represented as physical quantities within the computer's registers and/or memories or other information storage medium that may store instructions to perform operations and/or processes by the printing machine or elements, parts, modules or units of a printing machine.

Although embodiments of the invention are not limited in this regard, the terms "layer" and "object layer" as used herein may be used throughout the specification and claims to describe any lamina or film that may represent a cross-section or slice in an X-Y plane of a three-dimensional object. A layer may be formed and adhered to previously formed and adhered layers in a "layer by layer" fashion to create, build up or form in the Z direction a three-dimensional object.

Embodiments of the present invention are directed to a method of selectively depositing materials, layer by layer, to form a painted or colored three-dimensional (3D) object. The 3D colored object may be formed by selectively dispensing colored materials on at least a portion of the outer circumference of at least some of the layers. The width of the circumference or outline of a layer may include a few pixels and may be, for example, between 0.1 and 1 mm.

According to some embodiments, a white barrier outline may be formed adjacent to the colored outline of the layer using white building material and the building material used for the bulk of the 3D object may be transparent, white or colored, as desired. The white outline may be used as a white background to the apparent colored surface to ensure perception of bright colors and a large color gamut. It may enable using colorant types similar to those used for 2D white page printing. Further, the color calculations may be based on 2D color theory utilizing process color systems such as CMY, CMYK or CMYOGK. As known to a person skilled in the art, C stands for cyan, M for magenta, Y for yellow, O for orange, G for green and K for black.

According to embodiments of the invention, the method may include generating the image data by dividing the apparent surface of the 3D object into 3D color cells where each colored cell is defined by a tangential area with respect to the apparent surface and a depth dimension directing toward the inner region of the object. According to embodiments of the invention, the size of each 3D color cell may be determined according to the desired color spatial resolution and the desired color shade resolution in the surface area associated with the 3D color cell.

The method may further include generating color patterns for the 3D color cell according to the desired color shade of the cell, namely determining within the cell the desired basic color for each building voxel (volume pixel). The color pattern of the 3D color cells and additional data related, for example, to the shape of the object may be used as input data for generating the two-dimensional (2D) image data for each cross sectional layer of the object. In particular, based on the color patterns of the 3D color cells, the outline color data representing the outer circumference of each layer may be generated. The 2D image data of the layers may be used to selectively deposit materials of different colors based on the 2D image data to produce the 3D colored object.

As should be understood to a person skilled in the art, based on color management theory, the visual color at a point on the surface is "determined" by the color at that point and the colors of adjacent points on the surface and near the surface within the object. Therefore, each point may be affected by its adjacent points on the surface and within the object. It should be understood that these points are distributed across a plurality of printable layers that represent different parallel cross sections of the object.

The color pattern for the apparent surface of the 3D object may be determined using any known process color system. For example, a three-color system (CMY) that uses three basic colors, cyan (C), yellow (Y), and magenta (M) where black is provided by a substantially even amount of cyan, yellow or magenta or a four-color system CMYK that uses also black (K) color. According to embodiments of the invention, an additional white color (W) may be required to reflect the colorants which are not transmitted by the process colors and to be able to use a large number of different colors and shades.

In two-dimensional (2D) printing, the range of colors may also be increase by half toning. Half toning permits one to print using less than full saturation of the primary or basic colors (CMY). Using this process, small dots of each primary color may be printed in a pattern that may be small enough that the human eye may only perceive a single color. For example, in order to create the color green, one may create a halftone mix of cyan and yellow. Half toning is usually described in terms of gray levels. In 2D printing, the number of "gray levels" for each colorant (such as C,M,Y) is $$N_{gray} = N_x * N_y,$$

where $N_x$ is the number of pixels in the 2D color cell in X direction and $N_y$ is the number of pixels in the 2D color cell in the Y direction.

Accordingly, the number the number of different colors in 2D printing is $$N_{printing} = N_{gray}^3 \text{ for the 3-color system.}$$

Similarly, in three-dimensional (3D) printing, the number of gray levels for each colorant is equal to the number of voxels in the 3D color cell that is used to create the local color. For example, in the case of painting the outer surface of the object, the number of gray levels is $$N_{gray} = N_x * N_y * N_z,$$

where $N_x$, $N_y$ and $N_z$ are the number of pixels in the color cell in the X, Y and Z directions respectively.

In 3D printing, the 3D color cell may include both colored and uncolored voxels. The colored voxel may be formed by depositing both a transparent building material and a color additive onto the same point or by depositing a colored building material. The uncolored voxels may be formed by depositing white building material. The number of possible different colors, $N_{printing\ (3D)}$ may be different from number of possible different colors, $N_{printing}$ in 2D printing, when using colored building materials where the volume of the droplets of the different colored building materials is substantially the same. This is due to the fact that once a voxel is filled with a colored building material, it cannot accept another colored building material color. The number of color combinations in this case for a 4-color system is $$N_{printing(3D)} = N_{gray}! / ((N_{gray} - 4)! * 4!) \text{ and}$$

$$N_{printing(3D)} = N_{gray}! / ((N_{gray} - n)! * n!), \text{ for the general case of the } n\text{-color system.}$$

When the color material is deposited in a form of an additive where the droplet volume of the additive is much smaller than the droplet volume of the building material, more than one color additive may be added to each voxel. Therefore, in this case, the number of color combinations is $$N_{printing(3D)} = N_{gray}^n \text{ for an } n\text{-color system, where } n \text{ represents the number of color materials.}$$

It should be mentioned that the resolution of the printing heads and bitmaps associated with the color additives may be different than the resolution of the printing head and bitmaps associated with building material. This is because the size of the colored material droplets does not necessarily have to be equal to the building material droplets. Using smaller droplets for the additive may increase the number of gray levels. For example, if the color resolution is twice the building material resolution in both the X and Y directions, the number of gray levels for each color, $N_{gray}$ would be 4 times larger than the number of gray levels of a color that resolution that is identical to the building material resolution. According to exemplary embodiments of the present invention, the volume of each droplet of the color additive may be ⅕ of the volume of each building material droplet.

Reference is now made to FIG. 1, which is flowchart diagram of a method for generating a color pattern for the apparent surface of a 3D object and 2D image data for printing the 3D painted object according to embodiments of the invention. The method of assigning color to the apparent surface of the object may include dividing the apparent surface of the object into small patches where each patch defines a face of a 3D color cell (box 100). According to embodiments of the invention, each patch lies in a plane perpendicular to the normal of the surface at a respective point and has a tangential size which is determined by the desired spatial resolution of the color. The depth or thickness dimension of the 3D color cell may be determined by the number of gray levels that is desired for the color cell, namely, the color shade resolution.

Next, the process may include calculating the number of voxels in each color cell that should receive each of the basic colors (box 200). Accordingly, the process may include determining, for each color cell, the number of basic colors that should be assigned to the cells and which basic colors should be assigned to that cell and then calculating the number of voxels in the cell that should receive the assigned basic colors. The assigned basic colors may be scattered evenly within the color cell among the voxels associated with the particular cell. When the basic colors are deposited as additives to a transparent building material, more than one basic color may be deposited onto the same voxel. In such case, each basic color may be added to any number of voxels that is equal or smaller than the total number of voxels (N)

in the 3D cell. When the basic colors are deposited as building materials, each voxel can accept only one color.

When the basic colors are deposited as additives to the building material, the calculation of the color pattern of the color cell or color separation is similar to the calculation for 2D printing. It should be understood to a person skilled in the art that although the apparent surface of the object may not be flat, the area of the surface that is associated with a single color cell is small enough to be regarded as an area on a plane perpendicular to the normal to the surface at a point on the surface. Further, it should be understood to a person skilled in the art that the calculation of a color pattern of the 3D cell may be performed similarly to the calculation of a 2D color pattern since for a subtractive color system, such as YMCK, the color appearance of an area would be the same for a 2D cell or a 3D cell having the same mixture of basic colors and there would be no difference if the colored voxels are behind each other or near each other.

The calculation of color separation may be modified when the basic colors are a-priori inserted into the building materials to form colored building materials. As discussed, in such case, no more than one color may be assigned to a particular voxel. Accordingly, if the calculation of the color pattern results in the need for more voxels that may exist in the 3D cell, the number of voxels in the call may be increased by increasing the depth dimension of the cell. Alternatively, the number of color voxels for each separation may be proportionally decreased so that the sum of color voxels would not exceed the number of voxels in the 3D cell.

Next, the process may include assigning the colors to voxels in the 3D color cells by arranging the colors within the cell. According to embodiments of the invention, the colored voxels are chosen to be close to the apparent surface, if possible (box 300). The outcome of this process is the color pattern for the 3D cell where each voxel is either a colored voxel for which one or more basic colors are assigned to or uncolored voxel on which a white building material would be deposited. Then, using the color patterns, the two-dimensional (2D) image data for each cross sectional layer of the object may be generated (box 400). According to embodiments of the invention, the image data may include a white barrier outline having a width of several voxels located adjacent to the colored outline of the layer. The white building material may be deposited in each 2D layer to form a white barrier in the final product placed in between the apparent painted surface and the interior of the object that may be transparent. As discussed, the color calculation and colorant type may become similar to those used in the field of 2D printing on a white substrate.

According to some embodiments, the image data may include a transparent layer as the outer layer. The transparent layer may serve as a protective layer to protect the painted surface from deterioration and color modification over time. The transparent layer may increase the glossiness of the color and/or add hardness to the surface.

According to embodiments of the invention, the number of gray level for each base color, namely the desired color shade resolution may be selected independently of the desired color spatial resolution that is determined by the size of the tangential area of the cell. This is in contrast to 2D printing where the color spatial resolution and the color shade resolution are dependent of each other. As known to a person skilled in the art, there is a tradeoff between the size of the 2D cell and the number of gray levels for each basic color. Accordingly, when a high spatial resolution is desired, the size of the 2D color cell is chosen to be small and therefore the number of pixels is reduced, which in turn reduces the number of possible gray levels. According to embodiments of the invention, the number of possible gray levels in a 3D color cell may be adjusted by changing the depth dimension of the cell without changing the tangential area of the cell. For example, for given size of tangential area, the number of voxels in the cell may be increased by increasing the depth dimension of the cell.

According to embodiments of the invention, a user or a software module may determine a desired spatial resolution and a desired color shade resolution for a basic color. color shade resolution). The desired spatial resolution may determine the size of the tangential area Δs for all the color cells. Based on the desired color shade resolution, the number of gray levels per color may be determined. The depth dimension (d) of the 3D cell may be determined as follows:

$$D = v*N/\Delta s,\qquad [\text{eq. 1}]$$

Where v is the volume of a voxel and N is the number of voxels in the 3D cell. When the basic colors are additives to the building material, N may be regarded as equal to the desired number of gray levels per color.

According to embodiments of the invention, the size of the tangential area Δs may vary according to the content of the painted surface. For example, if the required color varies strongly between a first area on the surface and a second area, the software may determine, in order to achieve a better print quality, that the tangential area for color cells in the first area may have smaller size than the tangential area for color cells in the second area. Optionally, in order to preserve a fixed number of voxels, the depth dimension of the cell may be varied according to Eq. 1. Alternatively, both the size of the tangential area Δs and the number of voxel in the cell may be determined locally based on the content of the painted surface.

Figure 2:
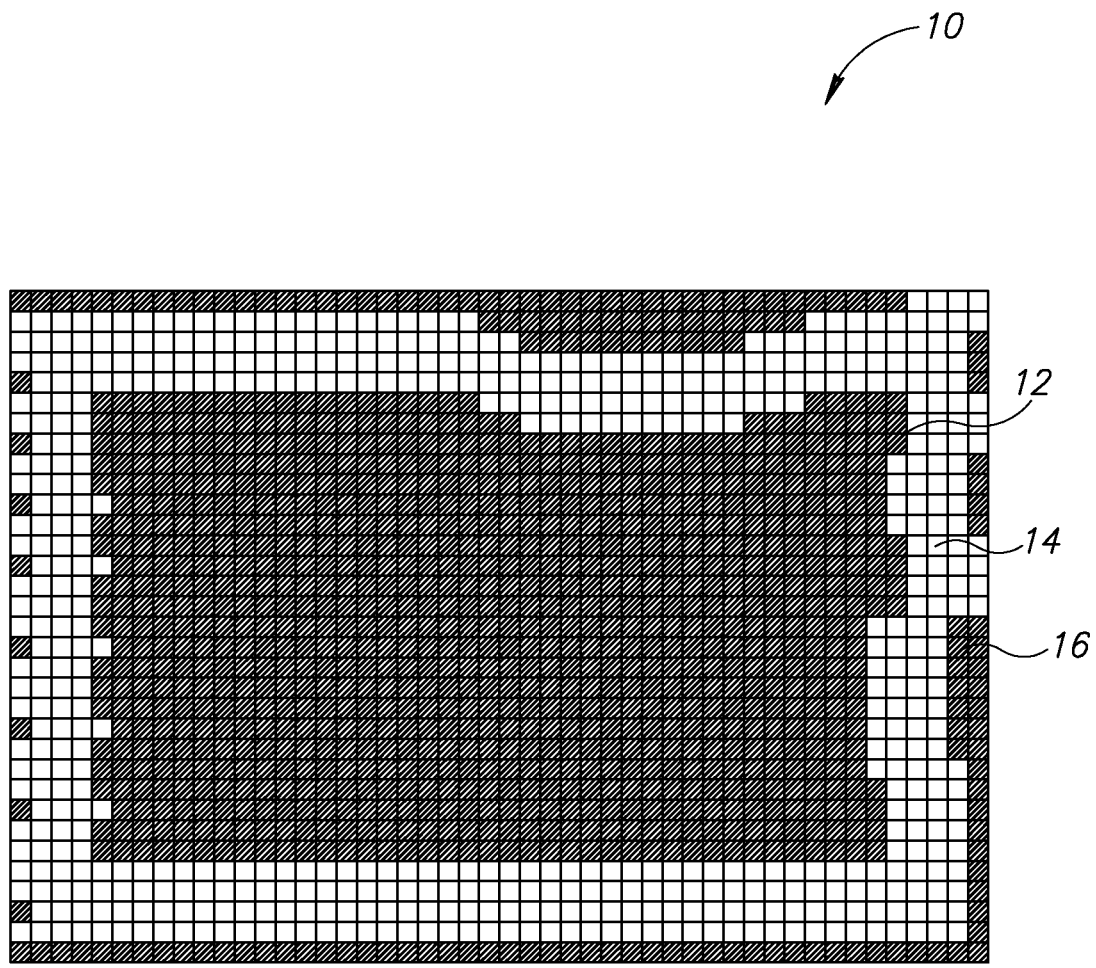
FIG. 2 is graphical representations of an exemplary bitmap of a layer of the 3D object according to embodiments of the invention.

Reference is made to FIG. 2, which is a schematic representation of a layer bitmap of a three-dimensional object according to embodiments of the invention. In some embodiments, layer bitmap 10 may comprise building material pixels 12, namely pixels representing a command to deposit non-colored building material, white pixels 14 representing the white barrier, and colored pixels 16. As illustrated, colored pixels 16 are only located on the outer circumference of layer bitmap 10. As illustrated, the width of the white barrier is 4 pixels for the entire circumference of the barrier. It should be understood that embodiments of the invention are not limited in this respect and other width may ne likewise applicable. Colored pixels 16 may be intended to accept one or more basic colors. The color white may be used on the apparent outer surface in cases where any of the other colors are not used. The reason for this is so that the outer surface of the three-dimensional object is kept smooth.

The remainder of layer bitmap 10 may comprise building material pixels 12. According to some embodiment, the building material is transparent. In another embodiment, the building material may be white material. In this case, there is no need for white pixels 14, as the white building material may serve the same purpose as white pixels 14. It should, however, be understood to a person skilled in the art that embodiments of the invention are not limited in this respect and that the building materials may be tinted with any other color.

Figure 3:
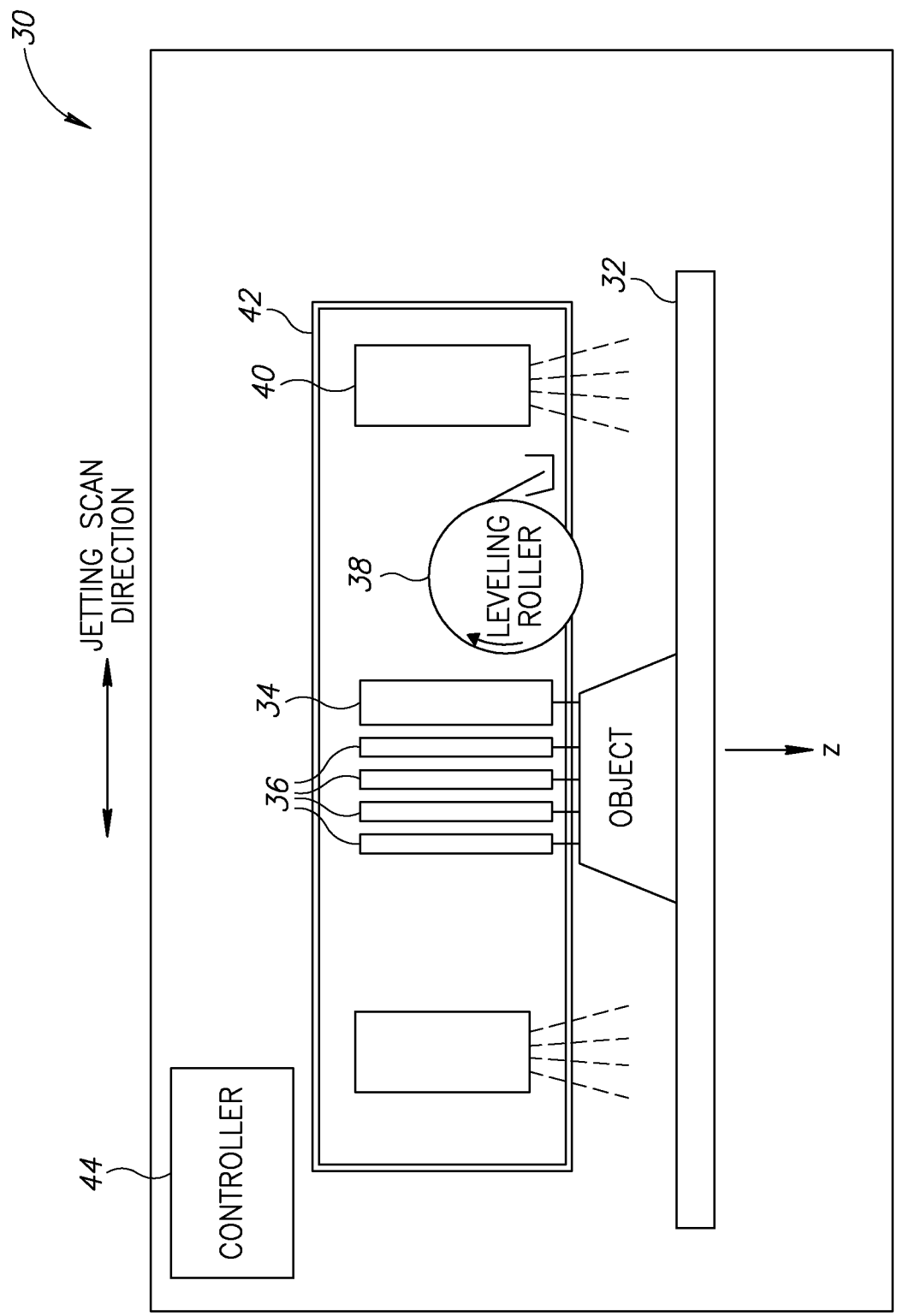
FIG. 3 is a schematic illustration of an exemplary printing system according to embodiments of the invention.

Reference is made to FIG. 3, which is an illustration of a depositing system for producing painted three-dimensional objects according to embodiments of the invention. A deposition system, such as, an inkjet printing system 30 may include a fabrication platform or tray 32, a printing head 34 that is used to dispense building material and at least one colored printing head 36 that is used to dispense colorants. For example, in the case where a 4-color system may be used, the system may comprise four separate color printing heads 36. System 30 may further include a leveling device 38 and at least one curing unit 40. Printing heads 34 and 36 may be coupled to a moving frame 42 to enable the printing heads to move above fabrication tray 32 in both X and Y directions.

System 30 may further include a controller 44, such as a microprocessor to control the printing process. Such a controller may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components. Controller 44 may instruct the print heads to selectively deposit building materials and color additives based on image data generated according to embodiments of the present invention. Accordingly, controller 44 may include computer-storage medium having stored thereon instructions that may be delivered to the printing heads for selectively printing layer by layer.

The material used in color printing heads 36 may or may not be the same material which is used for the building material. In general, the building material may be a photopolymer with a high viscosity. According to embodiments of the invention, the colored material may be an additive to the building material made of a material that is not polymerizable. For example, the colorant may be based on a low viscosity material to enable the use of unheated printing heads. Since the quantity of colored material used in each layer is only a fraction of the total amount of material used in each layer, the storage tanks (not shown) used for the colored material may be placed as close as possible to colored printing heads 36, while the storage tank (not shown) used for the building material may placed in a stationary location and connected to printing head 34 by pipe.

According to embodiments of the invention, the color additives may be dispensed before the building material, so that leveling apparatus 38 may not reduce the amount of the colorant. In some embodiments, printing head 34 may be placed between leveling apparatus 38 and color printing heads 36.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of printing heads" may include two or more printing heads.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Some embodiments of the present invention may be implemented in software for execution by a processor-based system. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Such a system may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of printing a three-dimensional object, layer by layer, the method comprising, for a layer, printing a bulk inner region and a color outline which includes voxels on at least a portion of a circumference of the bulk inner region formed by depositing a colored building material.

2. The method of claim 1, wherein the layer further comprises a white barrier outline.

3. The method of claim 2, wherein the white barrier outline is formed adjacent to the colored outline.

4. The method of claim 2, wherein the white barrier outline is formed by depositing a white building material.

5. The method of claim 1, wherein the bulk inner region is formed by depositing a transparent material, a white material, a colored material or any combination thereof.

6. The method of claim 1, wherein the layer further includes a transparent outer layer.

7. The method of claim 1, wherein the width of the color outline is between 0.1 and 1 mm.

8. A three-dimensional object printed in layers, wherein a layer comprises a bulk inner region and a color outline which includes voxels on at least a portion of a circumference of the bulk inner region formed by colored building materials.

9. The three-dimensional object of claim 8, wherein the layer further comprises a white barrier outline.

10. The three-dimensional object of claim 9, wherein the white barrier outline is formed adjacent to the colored outline.

11. The three-dimensional object of claim 9, wherein the white barrier outline is formed by depositing a white building material.

12. The three-dimensional object of claim 8, wherein the bulk region is formed by depositing a transparent material, a white material, a colored material or any combination thereof.

13. The three-dimensional object of claim 8, wherein the layer further includes a transparent outer layer.

14. The three-dimensional object of claim 8, wherein the width of the color outline is between 0.1 and 1 mm.

\* \* \* \* \*